United States Patent [19]

Nilsson

[11] Patent Number: 5,660,685
[45] Date of Patent: Aug. 26, 1997

[54] GASIFYING BLACK LIQUOR WITH RECYCLING OF GENERATED HYDROGEN SULPHIDE GAS TO THE GASIFIER

[75] Inventor: Bengt Nilsson, Skoghall, Sweden

[73] Assignee: Chemrec Aktiebolag, Karlstad, Sweden

[21] Appl. No.: 345,448

[22] Filed: Nov. 21, 1994

Related U.S. Application Data

[63] Continuation-in-part of Ser. No. 244,684, Jun. 7, 1994, abandoned.

[51] Int. Cl.$^6$ .............................. D21C 11/12; D21C 11/06
[52] U.S. Cl. .............................. 162/16; 162/30.1; 162/31; 162/51
[58] Field of Search .............................. 162/30.1, 31, 47, 162/16, 51

[56] References Cited

U.S. PATENT DOCUMENTS

| | | | |
|---|---|---|---|
| 3,762,989 | 10/1973 | Tinpe | 162/16 |
| 4,198,388 | 4/1980 | Laslo et al. | 423/574 |
| 4,872,950 | 10/1989 | Andersson et al. | 162/15 |
| 4,957,515 | 9/1990 | Hagarty | 55/43 |
| 5,220,782 | 6/1993 | Brown et al. | 60/39.02 |
| 5,277,884 | 1/1994 | Shinnar et al. | 423/226 |
| 5,382,322 | 1/1995 | Magnotta et al. | 162/30.4 |

FOREIGN PATENT DOCUMENTS

| | | |
|---|---|---|
| 990014 | 1/1976 | Canada. |
| 9108337 | 6/1991 | WIPO. |

*Primary Examiner*—Donald E. Czaja
*Assistant Examiner*—Dean T. Nguyen
*Attorney, Agent, or Firm*—Farkas & Manelli, PLLC

[57] ABSTRACT

A method of preparing a digesting liquor having high sulphidity from a spent liquor obtained from digesting cellulosic fiber material, optionally without a conventional causticizing step is provided. Thermal decomposition of the spent liquor is conducted under reducing conditions in a reactor at a pressure of from atmospheric pressure up to about 150 bar and at a temperature of about 500° to 1600° C. so that a combustible gas phase containing hydrogen sulphide is formed in the reactor and extracted therefrom, and a phase of solid or molten material of substantially sodium sulphide or potassium sulphide, or mixtures thereof. The solid or molten material is dissolved in an aqueous liquid to produce said digesting liquor. The invention hydrogen sulphide is recovered from the gas phase and returned to the reactor to be present during the thermal decomposition of the spent liquor.

10 Claims, No Drawings

GASIFYING BLACK LIQUOR WITH RECYCLING OF GENERATED HYDROGEN SULPHIDE GAS TO THE GASIFIER

This is a Continuation-in-Part of U.S. application Ser. No. 08/244,684, filed on Jun. 7, 1994, now abandoned.

FIELD OF THE INVENTION

The present invention relates to a method of preparing a digesting liquor having high sulphidity from a spent liquor obtained from digesting cellulosic fiber material.

BACKGROUND OF RELATED ARTS

During combustion of spent liquor from the sulphate pulp industry, for instance, two partial goals are aimed at, the first being that the organic wood substance released is combusted so that its chemical energy is converted to useful thermal and electric energy and the second being that the inorganic chemicals used shall be recovered and converted to active form. This means, among other things, that the sulphur shall be recovered in sulphide form, which requires under-stoichiometric combustion, while the energy recovery requires over-stoichiometric conditions. This means that two opposing processes must be performed simultaneously in one and the same combustion chamber which, with conventional soda recovery unit technology, results in optimizing problems.

The inorganic part recovered from the soda recovery unit, the melt, is dissolved to green liquor and consists of a plurality of chemical compounds. Most of these compounds consist of sodium carbonate and also sodium sulphide, the latter constituting the first one of the recovered active digesting chemicals in the white liquor. However, the cycle is not a hundred per cent efficient and some of the digesting chemicals are obtained in inactive form, thereby constituting ballast in the white liquor.

Preparation of the white liquor is the last step in the recovery of chemicals. Here the sodium carbonate in the green liquor is converted to sodium hydroxide by the reaction with calcium oxide (CaO), i.e. caustic lime. The second one of the two active digesting chemicals in the white liquor has thus been recovered.

The process is generally termed causticizing and an insoluble sludge consisting of calcium carbonate lime sludge is obtained as a by-product. Calcium oxide is recovered from the lime sludge by combusting it in a long, rotating furnace. The chemical cycle requires considerable energy and is not particularly harmless to the environment. The chemical composition of a normal melt from a soda recovery unit is typically as follows:

| Compound | % of melt (approx.) |
| --- | --- |
| Sodium carbonate $Na_2CO_3$ | 70 |
| Sodium sulphide $Na_2S$ | 27 |
| Sodium sulphate $Na_2SO_4$ | 3 |
| Sodium sulphite $Na_2SO_3$ | |
| Sodium thiosulphate $Na_2S_2O_3$ | small quantities |
| Sodium chloride NaCl | |

After causticizing, the chemical composition of a normal white liquor is typically as follows:

| Compound | Content in g/l (as NaOH) |
| --- | --- |
| NaOH | 100 |
| $Na_2S$ | 40 |
| $Na_2CO_3$ | 20 |
| $Na_2SO_4$ | 2.8 |

The white liquor recovered through a conventional soda recovery unit process has a sulphidity of 25–30%.

$$\text{Sulphidity} = \frac{Na_2S \times 100\%}{NaOH + Na_2S}$$

Swedish patent SE-C-8502731-6 describes an alternative process to the soda recovery unit technique, which is based on a gasification technique in which the organic substances in the black liquor are gasified in a first process in a pressurized reactor by means of "flash-pyrolysis" to provide CO, CO2, H2 and H2S, the residue obtained consisting primarily of the inorganic components of the spent liquor in solid or molten form having a composition corresponding to the melt from the soda recovery unit, i.e. mainly consisting of sodium carbonate and a small proportion of sodium sulphide. As with the soda recovery unit technique, this melt is dissolved and a green liquor is obtained which is treated in the same known manner as when the soda recovery unit technique is used.

The chemical composition of spent liquor from the sulphate pulp industry is typically as follows:

| | |
| --- | --- |
| Sodium + Potassium | 8.7 mol/kg DS black liquor |
| Sulphur | 1.8 mol/kg DS black liquor |
| Chlorine | 0.05 mol/kg DS black liquor |
| Carbon | 29.6 mol/kg DS black liquor |
| Hydrogen | 39.2 mol/kg DS black liquor |
| Oxygen | 21.0 mol/kg DS black liquor |

The mole ratio Na:S is 4.88:1.

Under certain operating conditions, such as at a pressure of 1.5 bar abs. and a temperature of 950° C. in the gasification reactor, a melt is obtained consisting of 59 per cent by weight of $Na_2CO_3$ and 31 per cent by weight of $Na_2S$.

Through Swedish patent SE-C-465 039 it is known to continuously supply sulphur compounds to the black liquor in order to alter the composition of the melt. By altering the mole ratio Na:S to 1.5:1 by the addition of 4 mol sulphur/kg DS thick liquor a melt having high sulphidity consisting substantially of 14 per cent by weight of $Na_2CO_3$ and 80 per cent by weight of $Na_2S$ is obtained under otherwise identical operating conditions.

Due to its large content of sodium sulphide the melt thus consists for the most part of active digesting chemicals, i.e. white liquor.

However, the difficulty is to maintain the low mole ratio Na:S, and if possible to reduce it even further, in order to obtain a white liquor of nearly 100% sulphidity. The amount of available sulphur compounds in a sulphate factory, for instance, is limited and only a small portion of the total amount of black liquor can therefore be treated in a gasification process of this type, unless sulphur is supplied externally. In practice this is impossible to maintain continuously for sulphur balance reasons. It is therefore difficult to maintain a low mole ratio under certain operating conditions—as is accentuated by the following operating example.

Increased pressure displaces the reaction towards the formation of carbonate in the following equilibrium reaction:

$$Na_2CO_3 + H_2S \rightleftharpoons Na_2S + CO_2 + H_2O.$$

When the gas produced is supplied to a gas turbine a higher pressure is desirable in the gasification reactor.

In this operating example, therefore, the melt obtained contains an even larger proportion of sodium carbonate and an even larger addition of sulphur compounds is necessary. If, for instance, the previously specified chemical composition of the black liquor and the amount of sulphur added remain the same but the pressure is increased from 1.5 bar abs. to 25 bar abs., i.e. the mole ratio Na:S of 1.5:1 is maintained, a melt is obtained consisting substantially of 52 per cent by weight of $Na_2CO_3$ and 39 per cent by weight of $Na_2S$, i.e. a melt in which the carbonate content has increased from 14% to 52% by weight. This means that causticizing is still required and also that the sulphidity in the melt decreases, which can be a disadvantage.

It is clear from the above that if increased pressures in the gasification reactor are used, mole ratios are required which are lower the higher the pressure is, and increasing amounts of sulphur compounds must be added in order to displace the above reaction to the right. It will be recognized that the quantities of sulphur required would be unmanageably large, in particular in the upper pressure levels.

SUMMARY OF THE INVENTION

An object of the present invention is to provide a method of preparing digesting liquor having high sulphidity from spent liquor which enables an essential part of, or even all the spent liquor produced in a digesting process to be dealt with so that conventional recovery technique such as causticizing and lime sludge burning are reduced and eliminated, respectively.

The method according to the invention is characterized in that hydrogen sulphide is recovered from the gas phase extracted and is returned to the reactor to be present during the thermal decomposition of the spent liquor.

DETAILED DESCRIPTION OF PREFERRED EMBODIMENTS

An embodiment relates to a method of preparing a digesting liquor having high sulphidity from a spent liquor obtained from digesting cellulosic fiber material, the method comprising the steps of thermal decomposition of the spent liquor in at least one reactor at a pressure of from atmospheric pressure up to about 150 bar and at a temperature of about 500° to 1600° C. The thermal decomposition is carried out under reducing conditions without addition of oxygen-containing gas or by the controlled addition of an oxygen-containing gas in a quantity of from nearly 0 up to 80% of the quantity of oxygen required stoichiometrically for complete oxidation of substances produced during the thermal decomposition. A combustible gas phase is formed in the reactor and extracted therefrom. A phase of solid or molten material comprising substantially sodium sulphide, potassium sulphide or a mixture thereon is also formed in the reactor. The solid or molten phase is dissolved in aqueous liquid to produce the digesting liquor. The gas phase contains hydrogen sulphide which is recovered and returned to the at least one reactor.

Preferably, the quantity of hydrogen sulphide returned is adjusted so that the mole ratio between sodium and/or potassium supplied by the spent liquor and sulphur supplied partly by the spent liquor and partly by the return of hydrogen sulphide amounts to 4:1 and below, preferably 2.8:1 and below, most preferably 1.5:1 and below. Recovery and return of hydrogen sulphide preferably take place continuously.

The invention enables gasification of black liquor under the required low mole ratio of (Na and/or K):S in order to produce a melt in the gasification step consisting substantially of sodium sulphide ($Na_2S$) and/or potassium sulphide ($K_2S$) which, after being dissolved in liquid (in a quenching step, for instance, or in a liquid film cyclone), immediately produces a white liquor having very high sulphidity, preferably 100% sulphidity, for example, if sodium sulphide is present: $Na_2S + H_2O \rightarrow NaHS + NaOH$. A similar reaction would occur for potassium.

The invention enables the complicated and expensive causticizing step, also including the lime kiln, to be eliminated from the recovery cycle. White liquor having high sulphidity also enables alteration of the digesting process. High sulphidity is particularly favorable in the initial stages of pulp digestion.

Recirculation of hydrogen sulphide establishes such a high partial pressure of hydrogen sulphide in the gasification step that the equilibrium reaction $Na_2CO_3 + H_2S \rightleftharpoons Na_2S + CO_2 + H_2O$ is displaced so far to the right that the formation of $Na_2CO_3$ is suppressed. A similar displacement of the equilibrium reaction for potassium carbonate and potassium sulfide would occur.

According to thermo-chemical equilibrium calculations performed, this is achieved at a gasification pressure of 1.5 bar abs., for instance, and when the mole ratio of (Na and/or K):S in the black liquor supplied to the gasification reactor, including the sulphur in the recirculated hydrogen sulphide gas, is 1.0 or lower. At the higher gasification of 25 bar abs. mentioned earlier, the above mole ratio must be reduced to 0.5 or lower.

In the two operating cases exemplified the actual partial pressure of H2S can be seen in the following table:

| Operating pressure reactor bar abs. | Mole ratio (Na and/or K):S | $H_2S$ partial pressure bar abs. |
|---|---|---|
| 1.5 | ≦1.0 | 0.07 |
| 25.0 | ≦0.5 | 2.0 |

The partial pressure 0.7 bar abs. (0.0492×1.5=0.0738) in the first case corresponds to 4.7% of the total pressure 1.5 bar abs. and the partial pressure 2.0 bar abs. in the second case corresponds to 8% of the total pressure 25.0 bar abs. This means, therefore, that the concentration of hydrogen sulphide must be increased from 4.7% to 8% when the total pressure in the reactor is increased from 1.5 bar abs. to 25.0 bar abs.

To maintain the higher partial pressure of $H_2S$ required in order to obtain a white liquor having high sulphidity, preferably 100% sulphidity, in a quenching step, for instance, according to the invention the $H_2S$ content in the process gas is returned to the gasification reactor.

This return is achieved by allowing the gas to pass through a gas washing apparatus for selective and regenerative absorption of the $H_2S$ content. Examples of such absorption processes are the Purisol process which utilizes N-methylpyrrolidone as an absorption liquid, and the Dow Gas/Spec-process which utilizes methyldiethylamine (MDEA) as an absorption agent. Using these processes, for example, more than 99% of the $H_2S$ content of the gas can be washed out, driven off from the absorption liquid via a regeneration step, and returned to the gasification step.

Some form of sulphur or sulphur compound is added to the gasification reactor when it is started up in order to build up the required high $H_2S$ level in the system/cycle, and thus the necessary (Na and/or K):S mole ratio at the actual reactor pressure. Such external additions of sulphur may also be carried out during the process in order to compensate any sulphur losses in the circulation system or when the partial pressure for $H_2S$ is to be increased due to increased pressure in the reactor. Such supplementary sources of sulphur may consist of a sulphurous secondary fuel, sulphurous gas from the digester house or evaporation plant, which can be supplied via the secondary air for the reactor or via the above-mentioned hydrogen sulphide regeneration step, elementary sulphur, sodium sulphate and/or potassium sulphate or sulphurous residue acid from the production of chlorine dioxide. However, if the entire flow of black liquor from the factory is gasified—i.e. no soda recovery unit is used—and without chlorine dioxide bleaching, said sodium sulphate and/or potassium sulphate, and residue acid are not available.

The regenerated $H_2S$ gas is thus returned to the gasification reactor to maintain the required $H_2S$ partial pressure. According to a suitable embodiment the $H_2S$ gas may be utilized entirely or partially as atomization gas for the black liquor addition in the burner nozzle.

The $H_2S$ gas recovered from the process gas from a reactor can be distributed so that one part is returned to this first reactor and the remainder to a second reactor which is supplied with the same black liquor. Thus, according to this embodiment of the invention, two white liquors can be produced one having high sulphidity and the other somewhat lower sulphidity.

It is preferred that all the $H_2S$ gas recovered is recirculated to the reactor. If for some reason the entire quantity of the H2S gas recovered is not to be recirculated, the surplus is subjected to a suitable process such as the one generally known as the Claus process, for the recovery of elementary sulphur.

A measuring device may be disposed in the pipe for the process gas leading from the reactor, to measure the content of $H_2S$ or S in the gas. This measuring device is connected to control means that, via a valve, controls the supply of supplementary sulphurous material when the process is started up and during continuous operation if a sulphur loss occurs in the circulation or, alternatively, if not all the $H_2S$ recovered is to be circulated and instead elementary sulphur is to be recovered for some reason either temporarily or continuously.

The invention is applicable to spent liquors from both sulphate and sulphite pulp industry processes.

The thermal decomposition occurs under reducing conditions without the supply of oxygen-containing gas or with controlled supply of an oxygen-containing gas in a quantity corresponding to from nearly 0 up to 80%, preferably up to 60%, of the quantity of oxygen required stoichiometrically for complete oxidation of substances produced during the thermal decomposition.

The invention is further illustrated by means of the following examples.

Black liquor having an Na:S mole ratio of partly 4.88:1 (normal sulphidity) and partly 2.0:1 (100% sulphidity) was fed continuously into a reactor in which the temperature was maintained at 950° C. and the pressure at 1.5 bar abs. The dry solids content of the black liquor was 65%. Air preheated to a temperature of 500° C. was supplied in a controlled manner so that the quantity of oxygen reached 45% of quantity of oxygen required stoichiometrically for complete oxidation. The results from various tests are shown in the following Table 1.

Test 1 relates to conventional run, that is with normal sulphidity and without recirculation of $H_2S$. An addition of sulphur was made in the subsequent tests (2–6) to provide the reactor with the amount of supplementary sulphur necessary so that the stated Na:S mole ratio was set. Furthermore, in tests 3–6 $H_2S$ gas was recirculated to participate in this increase in added sulphur and subsequently to be responsible for maintaining the stated mole ratio. Increased recirculation of $H_2S$ gas resulted in a corresponding increase in its partial pressure so that the amount of sodium carbonate formed was reduced and the amount of sodium sulphide correspondingly increased. The gas extracted continuously from the reactor was caused to pass a gas washing apparatus for the $H_2S$ content in the gas to be absorbed.

TABLE 1

| Test No. | Mole ratio Na:S in DS Dry Solids | Re-circ. $H_2S$ kmol/ton DS | Mole ratio Na:S in reactor | Content $H_2S$ in dry gas vol-% | Melt composition, weight-% | | |
|---|---|---|---|---|---|---|---|
| | | | | | $Na_2CO_3$ | NaOH | $Na_2S$ |
| 1 | 4.88:1 | 0.0 | 4.88:1 | 0.15 | 59.1 | 8.7 | 31.5 |
| 2 | 2.0:1 | 0.0 | 2.0:1 | 1.01 | 23.8 | 5.9 | 69.3 |
| 3 | 2.0:1 | 0.5 | 1.8:1 | 1.32 | 19.6 | 5.5 | 74.0 |
| 4 | 2.0:1 | 1.35 | 1.5:1 | 2.18 | 14.2 | 4.7 | 80.1 |
| 5 | 2.0:1 | 2.70 | 1.2:1 | 3.55 | 4.8 | 3.1 | 91.2 |
| 6 | 2.0:1 | 4.05 | 1.0:1 | 4.92 | 2.5 | 1.5 | 95.5 |

The results show that a forced increase in the $H_2S$ partial pressure obtained through recirculation of $H_2S$ gas provides a controlled decreased Na:S mole ratio in the reactor and accompanying conversion of the black liquor to white liquor having high sulphidity, without causticizing and lime sludge burning. If potassium is present, the (Na and/or K):S mole ratio will be similarly decreased.

While the invention has been described in detail and with reference to the specific embodiments thereof, it will be apparent to one of ordinary skill in the art that various changes and modifications can be made therein without departing from the spirit and scope thereof.

I claim:

1. A method for preparing a digesting liquor having high sulphidity from a spent liquor obtained from digesting cellulosic fiber material, optionally without a causticizing step, the method comprising the steps of:

(a) decomposing said spent liquor in at least one reactor at a pressure of from atmospheric pressure up to about 150 bar and at a temperature of about 500° to 1600° C., said thermal decomposition being carried out under reducing conditions without addition of oxygen-containing gas or by controlled addition of an oxygen-containing gas in a quantity corresponding to from nearly 0 up to 80% of the quantity of oxygen required stoichiometrically for complete oxidation of substances produced during said thermal decomposition, thereby forming a combustible gas phase and a phase of solid or molten material, said combustible gas phase containing hydrogen sulphide, and said solid or molten material comprising substantially sodium sulphide, or potassium sulphide, or a mixture thereof;

(b) extracting said combustible gas phase formed in said at least one reactor;

(c) dissolving said solid or molten phase in an aqueous liquid to produce said digesting liquor;

(d) recovering said hydrogen sulphide from said gas phase;

(e) returning said hydrogen sulphide to said at least one reactor to be present during said thermal decomposition of said spent liquor; and (f) adjusting the quantity of said hydrogen sulphide returned so that the mole ratio between sodium and/or potassium supplied by the spent liquor and sulphur supplied partly by the spent liquor and partly by said return of hydrogen sulphide amounts to 4:1 and below in said at least one reactor.

2. A method according to claim 1, further comprising the step of adjusting the quantity of said hydrogen sulphide returned so that the mole ratio between sodium and/or potassium supplied by the spent liquor and sulphur supplied partly by the spent liquor and partly by said return of hydrogen sulphide amounts to 2.8:1 and below.

3. A method according to claim 1, further comprising the step of adjusting the quantity of said hydrogen sulphide returned so that the mole ratio between sodium and/or potassium supplied by the spent liquor and sulphur supplied partly by the spent liquor and partly by said return of hydrogen sulphide amounts to 1.5:1 and below.

4. A method according to claim 1, wherein said recovery and return of hydrogen sulphide are effected in a closed recirculation loop.

5. A method as claimed in claim 1, wherein the pressure in said reactor is higher than or equal to 1.5 bar abs. and said mole ratio is less than or equal to 1:1.

6. A method according to claim 1, further comprising the step of adding additional sulphur through a secondary sulphur source during a starting-up stage in order to achieve a predetermined mole ratio between sulphur and sodium, or potassium or a mixture thereof, and during operation to maintain said predetermined value in the event of sulphur losses, or in order to change the mole ratio during operation to an even lower value, resulting in an equivalent increase in the partial pressure of the hydrogen sulphide.

7. A method according to claim 1, further comprising the steps of continuously carrying out the steps of extracting said combustible gas, recovering of hydrogen sulphide, returning said hydrogen sulphide to said reactor and, when applicable, transfer to a second reactor.

8. A method for preparing first and second digesting liquors having high sulphidity from a first spent liquor obtained from digesting cellulosic fiber material, optionally without a causticizing step, the method comprising the steps of:

(a) decomposing said first spent liquor in a first reactor at a pressure of from atmospheric pressure up to about 150 bar and at a temperature of about 500° to 1600° C., said thermal decomposition being carried out under reducing conditions without addition of oxygen-containing gas or by controlled addition of an oxygen-containing gas in a quantity corresponding to from nearly 0 up to 80% of the quantity of oxygen required stoichiometrically for complete oxidation of substances produced during said thermal decomposition, thereby forming a combustible gas phase and a phase of solid or molten material, said combustible gas phase containing hydrogen sulphide, and said solid or molten material comprising substantially sodium sulphide, or potassium sulphide or mixtures thereof;

(b) extracting said combustible gas phase formed in said first reactor;

(c) dissolving said solid or molten phase in an aqueous liquid to produce said first digesting liquor;

(d) recovering said hydrogen sulphide from said gas phase;

(e) returning a first part of said hydrogen sulphide gas extracted to said first reactor;

(f) adjusting the quantity of said first part of said hydrogen sulphide returned so that the mole ratio between sodium and/or potassium supplied by said spent liquor and sulphur supplied partly by said spent liquor and partly by the return of said first part of said hydrogen sulphide amounts to 4:1 and below in said first reactor;

(g) conveying a second part of said hydrogen sulphide gas extracted to a second reactor;

(h) supplying a second spent liquor to said second reactor, said second spent liquor optionally comprising a portion of said first spent liquor;

(i) decomposing said second spent liquor in said second reactor at a pressure of from atmospheric pressure up to about 150 bar and at a temperature of about 500° to 1600° C., said thermal decomposition being carried out under reducing conditions without addition of oxygen-containing gas or by controlled addition of an oxygen-containing gas in a quantity corresponding to from nearly 0 up to 80% of the quantity of oxygen required stoichiometrically for complete oxidation of substances produced during said thermal decomposition, thereby forming a second combustible gas phase and a second phase of solid or molten material, said second combustible gas phase containing hydrogen sulphide, and said second solid or molten material comprising sodium sulphide, or potassium sulphide or mixtures thereof; and (j) dissolving said second solid or molten phase in an aqueous liquid to produce said second digesting liquor.

9. A method according to claim 8, wherein said first part of said hydrogen sulphide gas extracted is greater than said second part of said hydrogen sulphide gas extracted, said second digesting liquor has a sulphidity lower than said first digesting liquor, a different partial pressure of the hydrogen sulphide gas is maintained in said first and second reactors, and said first reactor has a lower (Na and/or K):S mole ratio than said second reactor.

10. A method according to claim 8, further comprising the step of supplying a portion of said first spent liquor to the second reactor as said second spent liquor.

* * * * *